United States Patent [19]

Rifenburg et al.

[11] Patent Number: 5,360,078
[45] Date of Patent: Nov. 1, 1994

[54] MOTORCYCLE TORSION BAR REAR SUSPENSION

[75] Inventors: Byron P. Rifenburg, 12743 Paddy Creek La., Lodi, Calif. 95240; Christopher J. Handley, Bellevue, Wash.; Randy R. Stark, Santa Clara, Calif.

[73] Assignee: Byron P. Rifenburg, Lodi, Calif.

[21] Appl. No.: 901,824

[22] Filed: Jun. 22, 1992

[51] Int. Cl.$^5$ ............................................. B62K 11/02
[52] U.S. Cl. ................... 180/227; 280/284; 280/285; 267/273
[58] Field of Search ................ 180/227; 280/275, 283, 280/284, 285, 286, 288, 721, 723; 267/273, 285

[56] References Cited

U.S. PATENT DOCUMENTS

| | | | |
|---|---|---|---|
| 2,942,871 | 6/1960 | Kraus | 280/721 |
| 3,337,236 | 8/1967 | Peterson | 280/723 |
| 4,451,065 | 5/1984 | Williams | 180/227 |
| 4,463,824 | 8/1984 | Boyesen | 180/227 |
| 4,744,434 | 5/1988 | Miyakoshi et al. | 180/227 |
| 4,842,298 | 6/1989 | Jarvis | 267/273 |
| 5,005,859 | 4/1991 | Satoh | 280/721 |
| 5,007,497 | 4/1991 | Trema | 180/227 |
| 5,020,783 | 6/1991 | Schröder | 267/273 |
| 5,074,580 | 12/1991 | Wagner | 280/679 |

Primary Examiner—Karin L. Tyson
Assistant Examiner—A. M. Boehler

[57] ABSTRACT

A torsion bar rear suspension has many advantages over standard motorcycle suspensions. They include lowering the center of gravity, lowering total weight, and many others. The torsion bar rear suspension is located underneath the motorcycle's swing arm (9). A linkage system consisting of a linkage strut (8) and torque arm (7) transmits the torque from the swing arm to the torsion spring. The torsion spring is a combination of a torsion bar (5) and a thin walled torsion tube (6). The torsion spring exerts a force depending on the position of the swing arm (9). A damper (12) is mounted on the swing arm (9). The damper is compressed as the swing arm rotates about the swing arm pivot (15). The damper (12) exerts a force according to the speed the damper is compressed.

3 Claims, 3 Drawing Sheets

MOTORCYCLE TORSION BAR REAR SUSPENSION

BACKGROUND

1. Field of Invention

This invention relates to motorcycles, specifically to an improved suspension system for motorcycles.

2. Description of Prior Art

Rear wheel suspension is a crucial component for motorcycles. The actual suspension performance is adjusted according to rider preference. The overall suspension system can be improved.

Common suspension designs utilize a vertical helical spring damper system. It is located in the middle of the motorcycle. This design is inefficient. It has a high total weight, and a high center of gravity. It also lacks good manufacturability and maintenance qualities. Several other suspensions have been invented, trying to improve the standard design. Most suspension systems are inefficient for the following reasons:

a. The center of gravity of the suspension is too high. This makes the bike less maneuverable, and more susceptible to collisions.
b. The total weight of the suspension system is too high. This slows down the bike, and causes it to be less effective.
c. The adjustability of the system is inadequate. It is difficult to adjust spring preload. Preload is the force on the spring with zero deflection of the rear wheel.
d. The engine performance is inefficient. The air intake to the carburetor can be greatly enlarged if the standard suspension system is moved. The standard system restricts air to the carburetor. Removing the standard suspension system will improve engine performance.
e. The maintenance of the suspension system is inefficient. The number of parts that need maintenance can be decreased. Consequently, the suspension can be maintained easier.
f. The manufacturing costs are too high. Minimizing the number of parts in the suspension reduces manufacturing costs.

OBJECTS AND ADVANTAGES

Several objects and advantages of the torsion bar suspension system have been developed. Objectives for the design were the following:

a. to lower the center of gravity of the system,
b. to lower the total weight of the system,
c. to improve the adjustability of the system,
d. to increase the engine performance, and
e. to lower the manufacturing and maintenance costs of the system.

The advantages of this system may not seem decisive at a first glance, but people have spent millions of dollars to improve just one of these areas in the slightest way.

DRAWING FIGURES

REFERENCE NUMERALS IN DRAWINGS

| 5 Torsion Bar | 6 Torsion Tube |
|---|---|
| 7 Torque Arm | 8 Linkage Strut |
| 9 Swing Arm | 10 Reaction Mount |
| 11 Rotational Mount | 12 Damper |
| 13 Dampler Mount | 14 Frame |
| 15 Swing Arm Pivot | |

Figure 1:
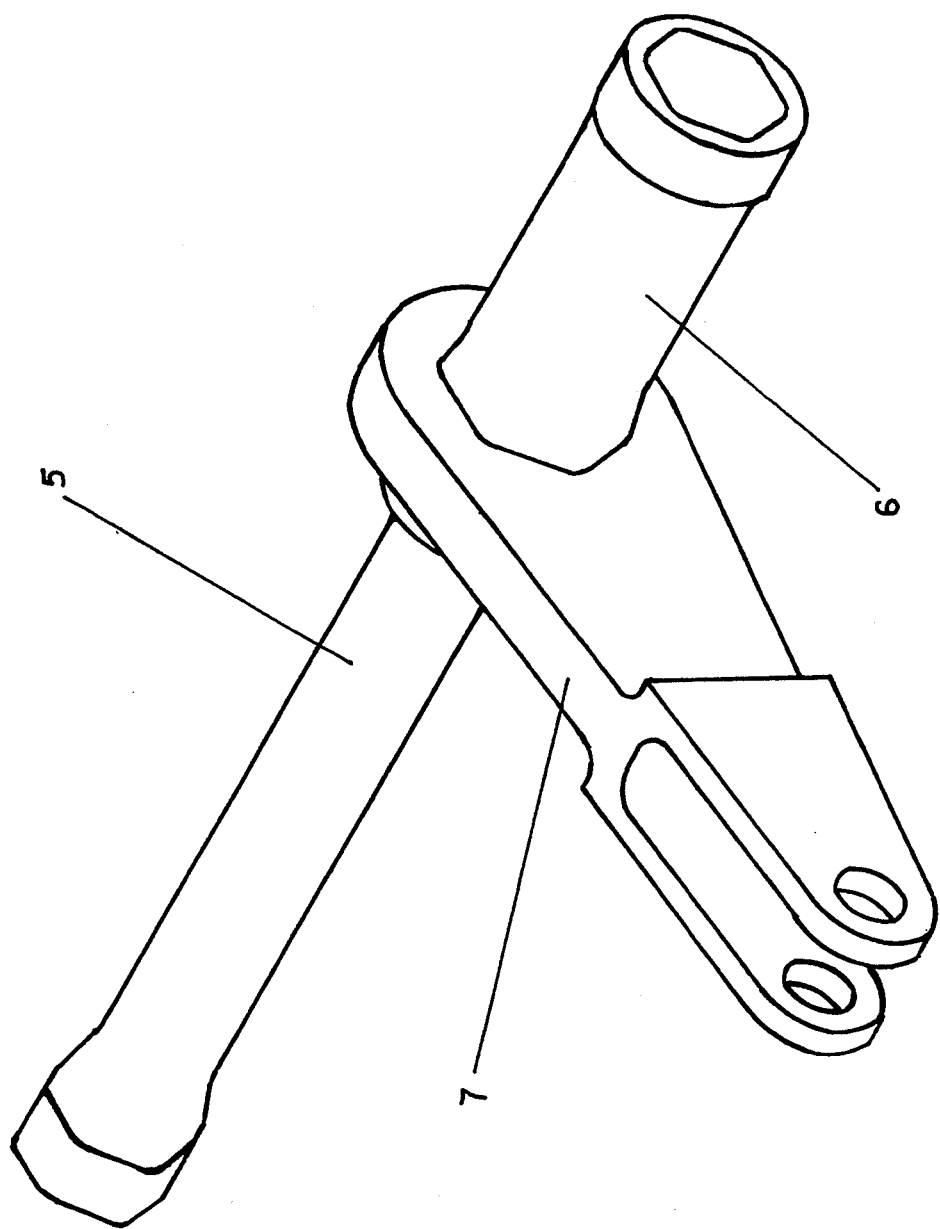
FIG 1 shows the torsion bar spring and torque arm not connected to the motorcycle.
Figure 2:
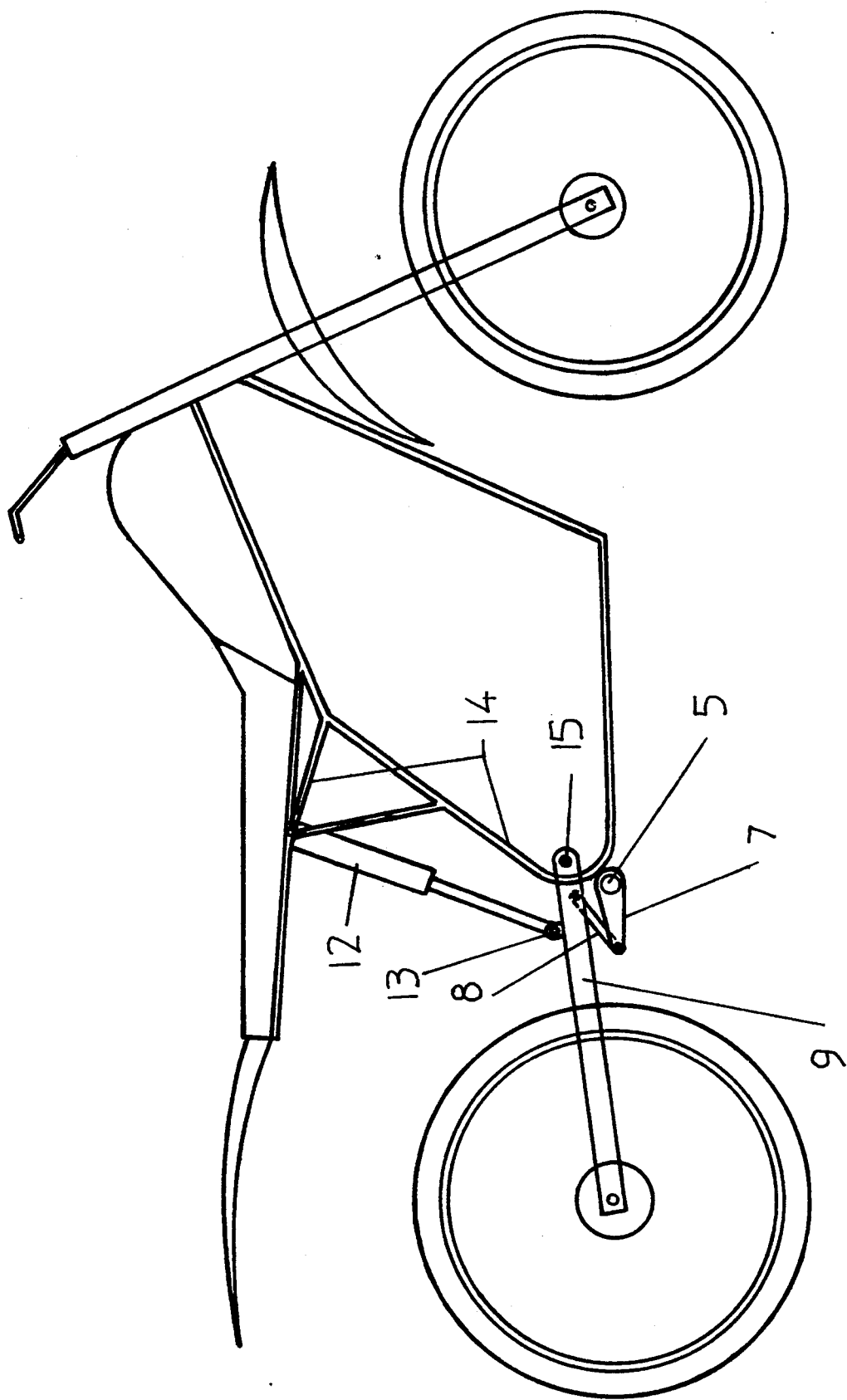
FIG. 2 shows a motorcycle with a torsion bar spring and separate damper.
Figure 3:
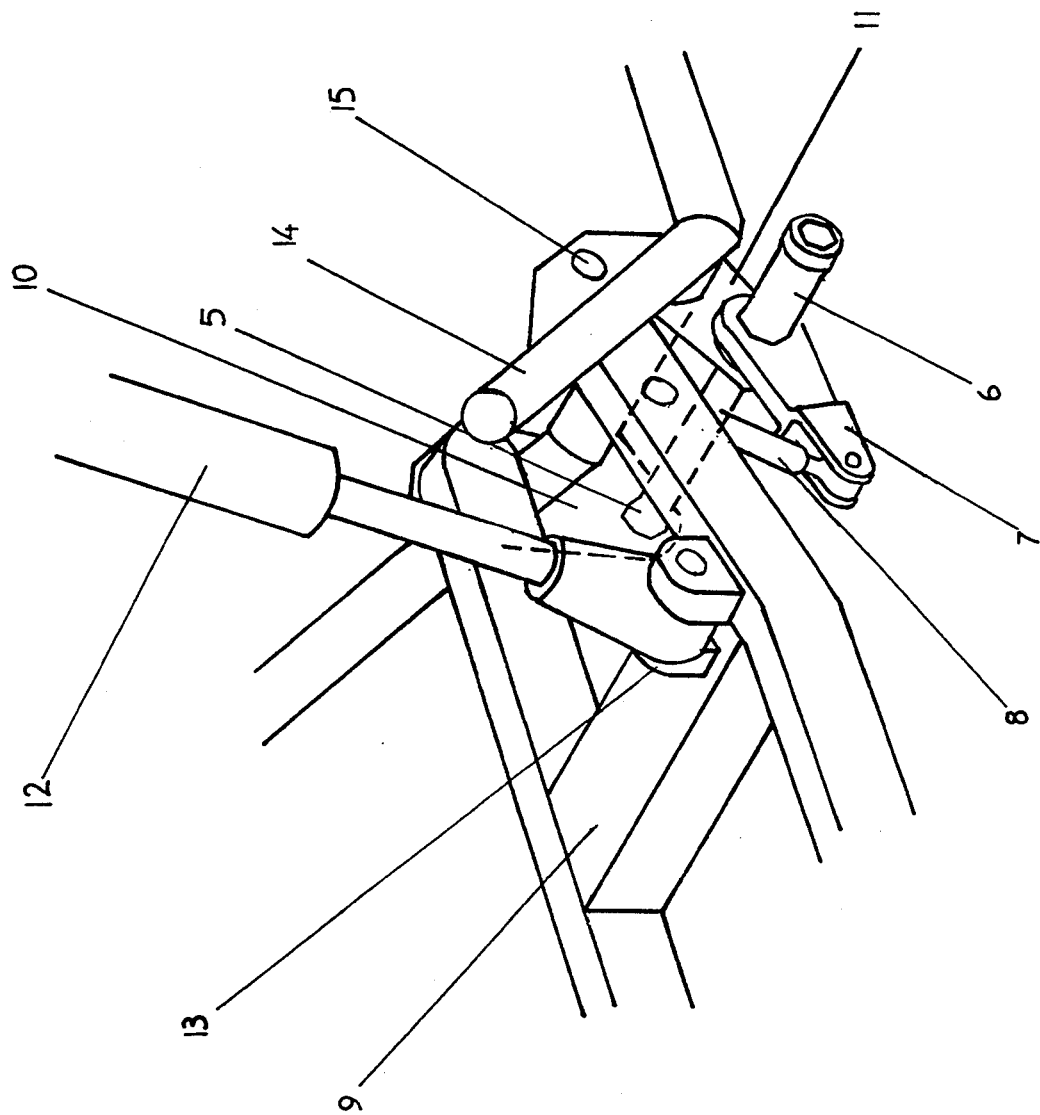
FIG. 3 shows the torsion bar spring mounted on the motorcycle in more detail.

DESCRIPTION - FIGS. 1 to 3

The location of the torsion bar spring (5) is best seen in FIG. 2. The torque arm (7) and linkage strut (8) make up the linkage. The linkage transmits torque from the swing arm (9) to the torsion bar (2). The linkage design allows for the swing arm to rotate 30 degrees, but the torsion bar only can rotate 15 degrees. This gives a mechanical advantage of two to one (30:15). Both the linkage and torsion bar spring are located underneath the swing arm (9). This location allows for the weight to be as close to the ground as possible.

FIG. 3 shows how the torsion bar (5) fits longitudally in the frame (14). The reaction mount (10) resists the torque of the torsion bar. The rotational mount (11) allows for one end of the torsion bar spring to rotate. This rotation takes place on a longitudal axis. The torque arm (7) gives the torsion spring the necessary torque. The torque is transmitted by the linkage strut (8). The linkage strut is connected to both the swing arm (9) and torque arm (7).

FIG. 1 shows how the torsion spring is actually built. The torsion spring is made up of a torsion bar (5) and torsion tube (6) connected together. Previously, I generalized the torsion spring and referred to it as a "torsion bar" or "torsion bar spring". However it is actually more complicated. They are attached together by a hexagon connection. This arrangement is necessary due to the space constraints of a motorcycle. The torsion spring functions like a longer spring than it actually is. The torque arm (7) is also attached to the torsion tube (6) by a hexagon connection. Hexagon connections are the cheapest to manufacture.

The damper (12) can be seen in either FIG. 2 or FIG. 3. FIG. 2 shows from the side how it is located. FIG. 2 shows the longitudal location of the damper. The damper is mounted to the swing arm (9) by damper mounts (13). The other end of the damper is attached to the frame (14) and is best seen in FIG. 2.

OPERATION - FIGS. 1 to 3

The operation of the torsion bar suspension is fairly simple. The swing arm (9) is forced rotationally about the swing pivot (15) by a foreign object. Consequently, the linkage strut (8) is forced vertically. The linkage strut then forces the torque arm (7) to rotate. The rotation is only half of the rotation of the swing arm due to the linkage design. The torsion spring rotates about a longitudinal axis located in the center of the rotational mount (11). The torsion tube (6) is twisted but resists the rotation. The torsion tube (6) transmits torque to the torsion bar (5). The torsion bar resists the rotation. The torque is resisted by the reaction mount (10) and does not move. The frame (14) absorbs the impact on the foreign object. The torsion spring exerts a force dependant on the position of the swing arm.

While the swing arm (9) rotates about swing arm pivot (15), the damper mount (13) moves vertically.

Since the top of the damper (12) is fixed to the frame (14), the damper is compressed. The damper is designed to resist motion depending on the speed of compression. The damper is eventually fully compressed. This means there is no more suspension travel. The torsion spring then brings swing arm (9) back to its original position.

SUMMARY: RAMIFICATIONS AND SCOPE

This design may revolutionize motorcycle design. Lowering the center of gravity on a dynamic machine is always advantageous. Lowering the center of gravity on a motorcycle is even more important due to the need for easy control of the motorcycle. Millions of dollars have been spent attempting to accomplish this goal. Our design also lowers the total weight of the motorcycle. This too is an important factor in motorcycle design. Again, many motorcycle manufacturer's dollars have been spent on lowering total weight. Our design is much easier to adjust than previous designs. It is located in a good location, and uses a turnbuckle to adjust spring preload. Our design takes seconds, while standard designs take ten to fifteen minutes to adjust. Obviously, a good selling point. Our design is also cheaper to manufacture than standard suspension systems. Maintenance costs are less due to fewer moving parts. However, the largest advantage is what can be done with the motorcycle if the standard suspension is moved to a better location. Standard designs are located right behind the carburetor. It is very confined in this area. The air filter must be routed around all this mess. Resulting in a rough flow of air entering the carburetor. The air box is also to small due to the tight space constraints. Our design fixes all that since it is located under the swing arm. We can use a larger air filter, and the flow is much better. This results in an increase in engine performance. There are other advantages of our suspension placement. The gas tank can be lowered. This results in a still lower center of gravity. Service to the engine and carburetor is much easier since the space is not as constricted. We have actually built a prototype and the performance of the suspension is actually better than the old suspension system. All of these advantages make for a revolutionary suspension system.

Although the description our design contains many specifications, this should not limit the scope of the design. The location of the torsion spring may be modified. The actual dimensions of torsion spring may change. The linkage may also be changed to fit underneath the swing arm better. The torsion spring design may also change. For road applications it may only be necessary to have a torsion bar and the torsion tube can be eliminated.

Thus the scope of this invention should be determined by the following claims and their legal equivalents, rather than the given example.

We claim:
1. A suspension system, suitable for a motorcycle comprising a frame, a motor, a damper, comprising;
   (b) a swing arm comprising at least one arm supporting at least one wheel, said swing arm is pivotally mounted to said frame, said swing arm rotates about its pivot mount with respect to said frame;
   (c) a torsion tube member which resists torsional moments having a first end portion and a second end portion, the first end portion is rotationally carried by said frame; and
   (d) a torsion bar member which resists torsional moments having a first end portion and a second end portion, the first end portion is secured to said frame, the second end portion of said torsion bar is attached to said second end portion of said torsion tube;
   (e) a lever arm having a first end portion and a second end portion, the first end portion of said lever arm is rigidly attached to said torsion tube; and
   (f) a linkage means pivotally connected to said swing arm and pivotally connected to the second end portion of said lever arm, said linkage means comprising at least one member, said swing arm and said linkage means and said torsion tube are attached such that an angular displacement of said swing arm causes a rotation of said torsion tube, a rotation of said torsion tube causes an increase in the resisting moments dependent on angular displacement of said swing arm.

2. The suspension system in accordance with claim 1 wherein both the torsion bar member and the torsion tube member are located on a generally coaxial center line, said torsion bar member is located within said torsion tube member, said torsion bar member and said torsion tube member are located on an axis that is generally parallel to the rotational axis of the swing arm.

3. The suspension system in accordance with claim 1 wherein the linkage means varies the angular displacement of both the torsion bar member and the torsion tube member with respect to the angular displacement of the swing arm.

* * * * *